United States Patent
Farrow et al.

(10) Patent No.: US 9,740,247 B2
(45) Date of Patent: Aug. 22, 2017

(54) CARD RETENTION MECHANISM

(71) Applicant: Lenovo (Singapore) Pte. Ltd., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US); Sean Hilliard, Anderson, SC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 37 days.

(21) Appl. No.: 14/229,890

(22) Filed: Mar. 29, 2014

(65) Prior Publication Data
US 2015/0277514 A1    Oct. 1, 2015

(51) Int. Cl.
*G06F 1/18* (2006.01)

(52) U.S. Cl.
CPC ............ *G06F 1/181* (2013.01); *G06F 1/186* (2013.01)

(58) Field of Classification Search
CPC .......... G06F 1/184; G06F 1/181; G06F 1/187; G06F 1/186; G06F 1/185; G06F 1/16; H05K 7/1429; H05K 5/00
USPC ...... 361/679.31, 792.22, 679.6, 752, 679.33, 361/679.37–679.39, 725, 825, 679.01, 361/679.02, 679.4, 724, 730, 740, 679.32, 361/801
See application file for complete search history.

(56) References Cited

U.S. PATENT DOCUMENTS

| | | | | |
|---|---|---|---|---|
| 6,261,104 B1* | 7/2001 | Leman | ..................... | G06F 1/184 439/61 |
| 7,002,811 B2* | 2/2006 | Jing | ..................... | H05K 7/1408 361/732 |
| 2005/0059285 A1* | 3/2005 | Chen | ..................... | G06F 1/184 439/325 |
| 2005/0088807 A1* | 4/2005 | Wu | ..................... | G06F 1/184 361/679.31 |
| 2009/0262508 A1* | 10/2009 | Fukui | ..................... | H05K 7/1408 361/759 |
| 2010/0020478 A1* | 1/2010 | Chu | ..................... | G06F 1/184 361/679.02 |
| 2010/0321907 A1* | 12/2010 | Chen | ..................... | G06F 1/186 361/759 |
| 2011/0299254 A1* | 12/2011 | Lin | ..................... | G06F 1/186 361/748 |
| 2014/0022753 A1* | 1/2014 | Fu | ..................... | H05K 7/1404 361/807 |
| 2014/0211402 A1* | 7/2014 | Wu | ..................... | G06F 1/186 361/679.32 |

* cited by examiner

*Primary Examiner* — Jerry Wu
*Assistant Examiner* — Stephen Sul
(74) *Attorney, Agent, or Firm* — Brian J. Pangrle

(57) ABSTRACT

A system can include a chassis; a board operatively coupled to the chassis where the board includes card slots aligned along respective parallel planes and circuitry operatively coupled to the slots; a retainer; and a bracket operatively coupled to the chassis where the bracket includes a guide that guides rotation of the retainer to and translation of the retainer along a plane orthogonal to the parallel planes. Various other apparatuses, systems, methods, etc., are also disclosed.

18 Claims, 8 Drawing Sheets

CARD RETENTION MECHANISM

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and one or more cards, for example, disposed in one or more card slots.

SUMMARY

A system can include a chassis; a board operatively coupled to the chassis where the board includes card slots aligned along respective parallel planes and circuitry operatively coupled to the slots; a retainer; and a bracket operatively coupled to the chassis where the bracket includes a guide that guides rotation of the retainer to and translation of the retainer along a plane orthogonal to the parallel planes. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
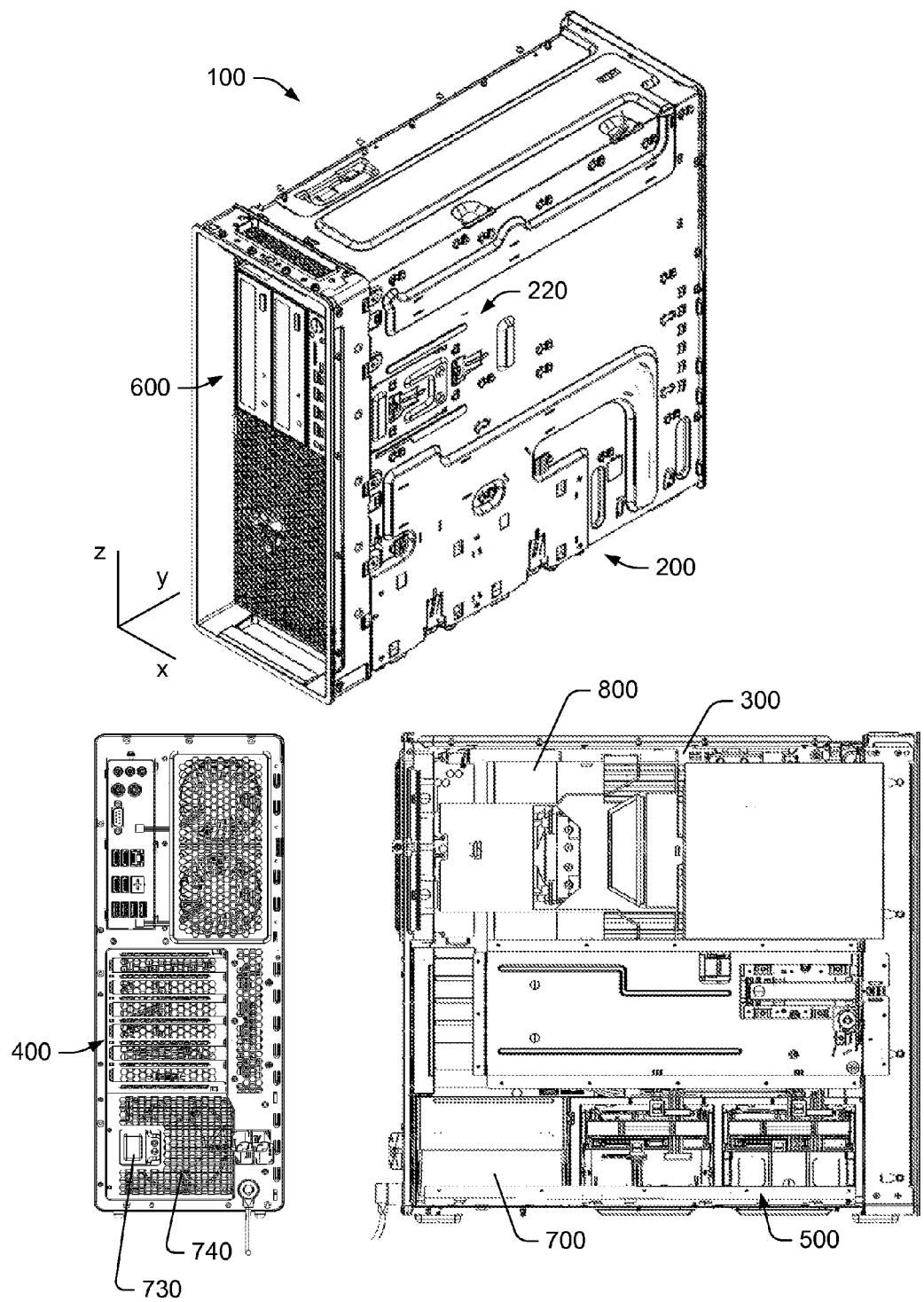
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply unit 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism 220 for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 1100 (see, e.g., the bays 500).

In the example of FIG. 1, the computing system 100 includes the power supply assembly 700, which includes a connector 730 for receipt of power (e.g., via a power cord) and which may include a fan 740 (e.g., or fans). The power supply assembly 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans). In the example of FIG. 1, a fan 801 is shown as being disposed in an x,z-plane proximate to the back of the computing system 100.

In the example of FIG. 1 the board 300 of the computing system 100 can include one or more processors 310-1 (e.g., and 310-2, etc.) and memory 330-1 and 330-2 accessible by at least one of the one or more processors (e.g., 310-1, 310-2, etc.). One or more of the bays 500 and/or the bays 600 of the computing system 100 may include one or more storage devices, which may be accessible by at least one of the one or more processors.

Figure 2:
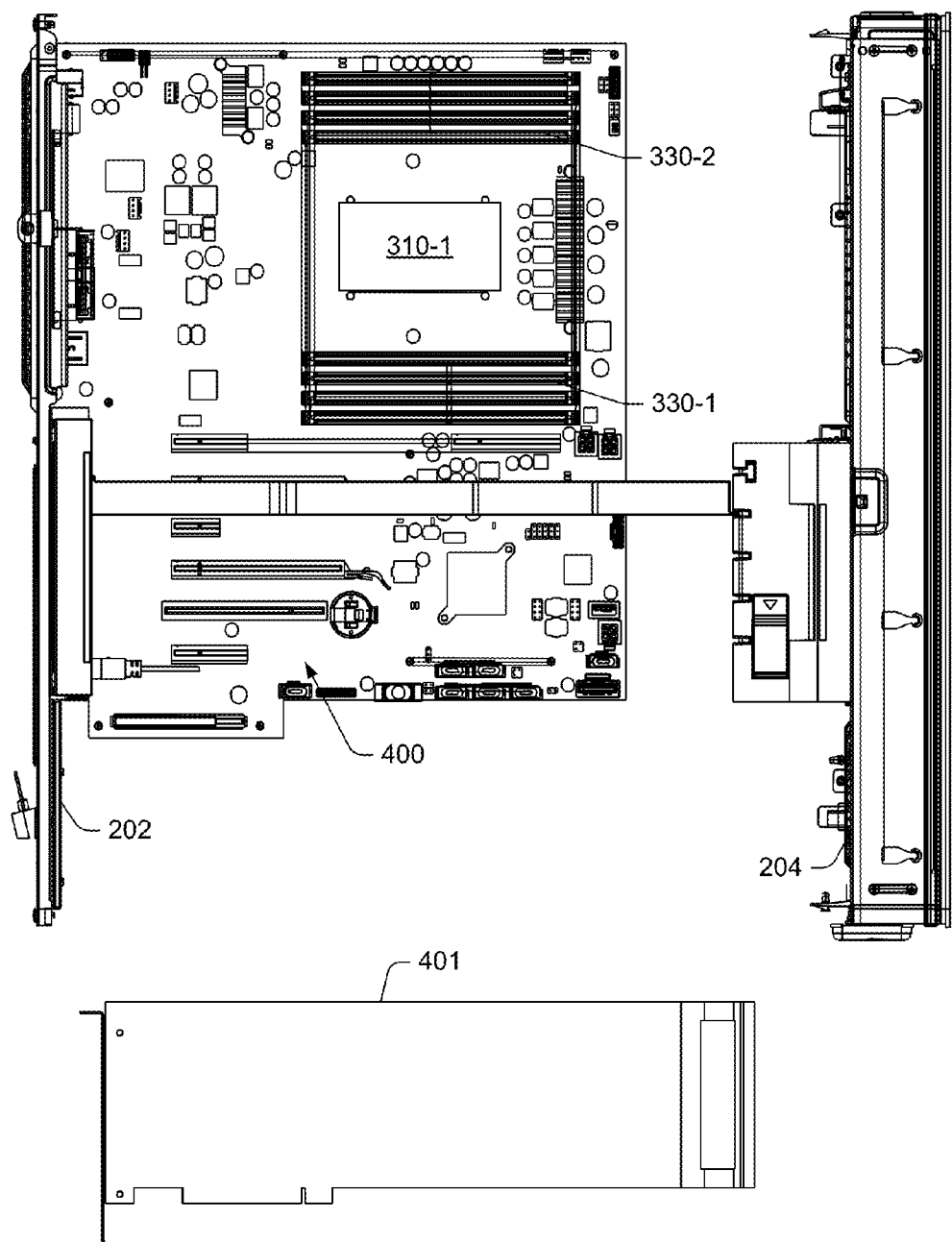
FIG. 2 is a series of diagrams that include a view of a portion of the computing system of FIG. 1 and a view of a card.

FIG. 2 shows an example of a portion of the computing system 100 of FIG. 1. In the example of FIG. 2, portions of the chassis 200 are shown, including a back portion 202 and a front portion 204. Various circuits or circuitry may be mounted to and/or integral to the board 300. For example, in FIG. 2, the board 300 is shown as carrying the processor 310-1 and memory 330-1 and 330-2.

As shown, the board 300 can include the slots 400 (e.g., at least a portion of a total number of slots of the computing system 100). As an example, a portion of the slots 400 may be oriented in parallel. For example, where such slots are configured for receipt of respective cards, the slots may orient the cards in parallel planes (e.g., with spaces therebetween for air flow, etc.).

As an example, slots may include card slots for cards such as, for example, PCI cards. As an example, a PCI card may be specified by a standard or standards. As an example, a maximum width of a PCI card may be about 15 mm (e.g., about 0.6 inches). As an example, a PCI card may be specified in part by height, for example, consider full-height and low-profile specifications. As an example, a card may include a backplate that may be configured to fasten the card to another component (e.g., a chassis, etc.), for example, to help stabilize the card. As to a backplate, it may be fixable using a screw such as, for example, a 6-32 or M3 screw. As an example, a card may include one or more external connectors.

As an example, a card may be specified in part by a length. For example, consider standards that specify full-length and half-length for full-height cards, and MD1 and MD2 for low-profile cards.

As an example, a slot may be a connector, for example, for electrically connecting circuitry of a card to circuitry of a board, etc. As an example, a PCI connector may be defined as including 62 contacts on each side of an edge connector where, for example, two or four contact positions are replaced by key notches. In such an example, a card may include 60 or 58 contacts on each side. In terms of numbering, a connector may use a "pin" based convention where, for example, pin 1 is closest to the backplate.

Figure 3:
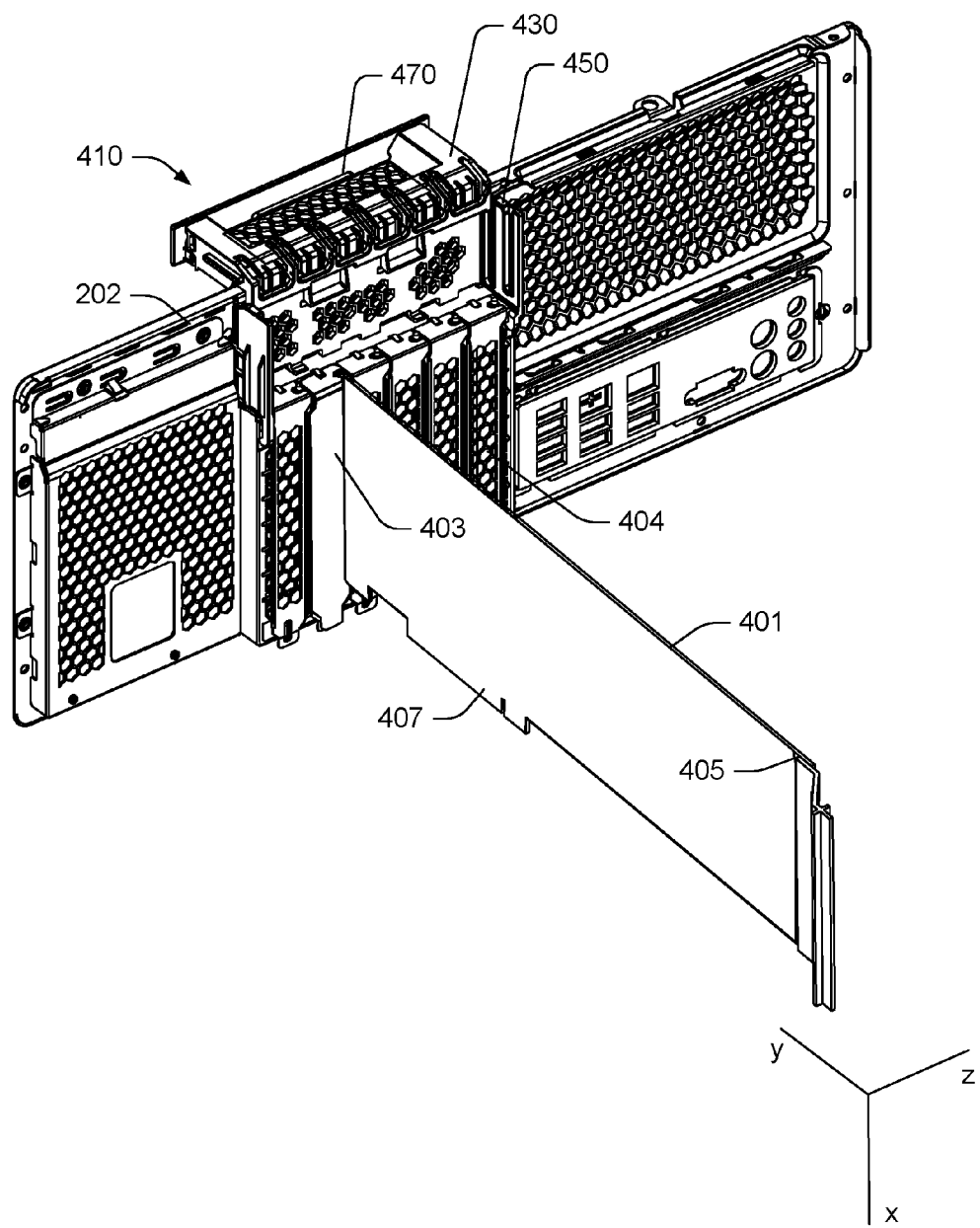
FIG. 3 is a diagram of a portion of the computing system 100 of FIG. 1 that includes a card retention assembly.

FIG. 3 shows an example of an assembly that includes the back portion 202 of the chassis 200, a card 401 and a card retention assembly 410 with a retainer 430 in an open orientation. As shown, the card retention assembly 410 also includes a bracket 450 that is operatively coupled to the back portion 202 of the chassis 200 where the bracket 450 can include a guide that guides rotation of the retainer 430 to and translation of the retainer 430 along a plane orthogonal to a plane defined by the card 401 (e.g., which may be disposed in one of a plurality of slots of a board such as the board 300 of FIG. 2). As an example, the card retention assembly 410 may include a handle 470 that may be operatively coupled to the retainer 430.

In the example of FIG. 3, the back portion 202 of the chassis 200 is shown as including one or more cover plates 404 mounted thereto, for example, optionally via one or more screws. In the example of FIG. 3, the board 401 is shown as including a backplate 403 operatively coupled thereto, a front piece 405 and an edge connector portion 407 that may be, for example, received in a slot (e.g., a slot of an edge connector).

As to the card retention assembly 410 of FIG. 3, in the open orientation, one or more cards may be disposed in one or more slots; whereas, in a retention orientation, the retainer 430 may be rotated and translated downward such that the retainer 430 retains the one or more cards in the one or more slots. In such an example, the one or more cards may include backplate where each backplate may optionally be configured for receipt of a screw.

As shown in FIG. 3, the retainer 430 may be transitioned to retain the card 401 at least in part via the backplate 403 of the card 401 whether the backplate 403 receives a screw or does not receive a screw. Where the backplate 403 is not screwed to the portion 202 of the chassis 200, the backplate 403 and card 401 attached thereto may possibly be removed without a tool or tools when the retainer 430 of the card retention assembly 410 is in the open orientation. In the retention orientation, the retainer 430 may apply a retention force to the backplate 403 of the card 401 where the retention force acts to retain the card 401 in a respective slot. As an example, a clearance may exist between a retainer and a backplate where the retainer limits movement of the backplate, for example, to avoid unseating of a card from a slot where the card is attached to the backplate.

In the example of FIG. 3, the retainer 430 is shown oriented along a plane that is orthogonal to a plane of the card 401. The retainer 430 may be rotated to another plane, also orthogonal to the plane of the card 401, and may be translated in that plane, for example, downward toward the card 401.

Figure 4:
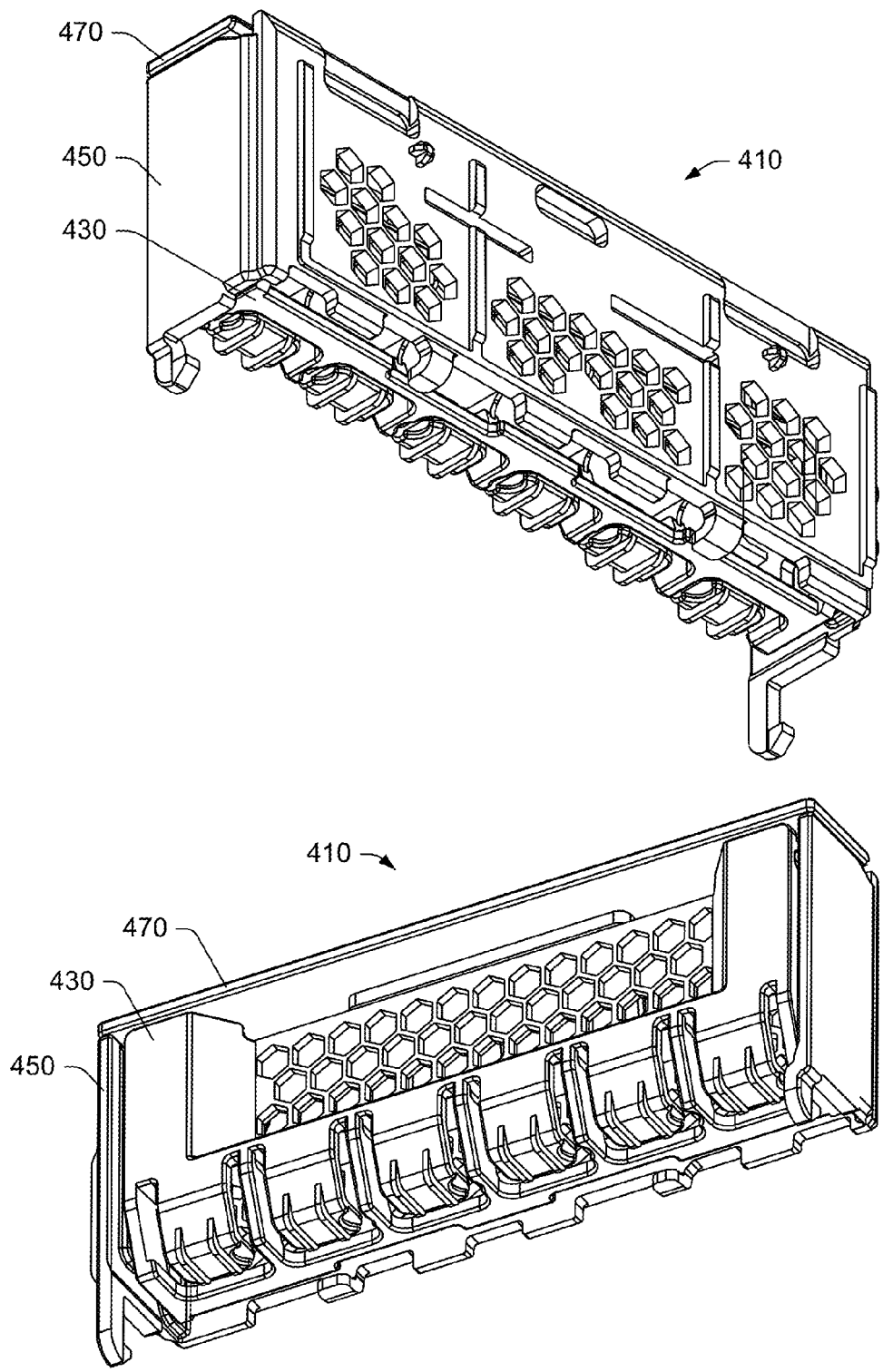
FIG. 4 is a series of diagrams of perspective views of the card retention assembly of FIG. 3.
Figure 5:
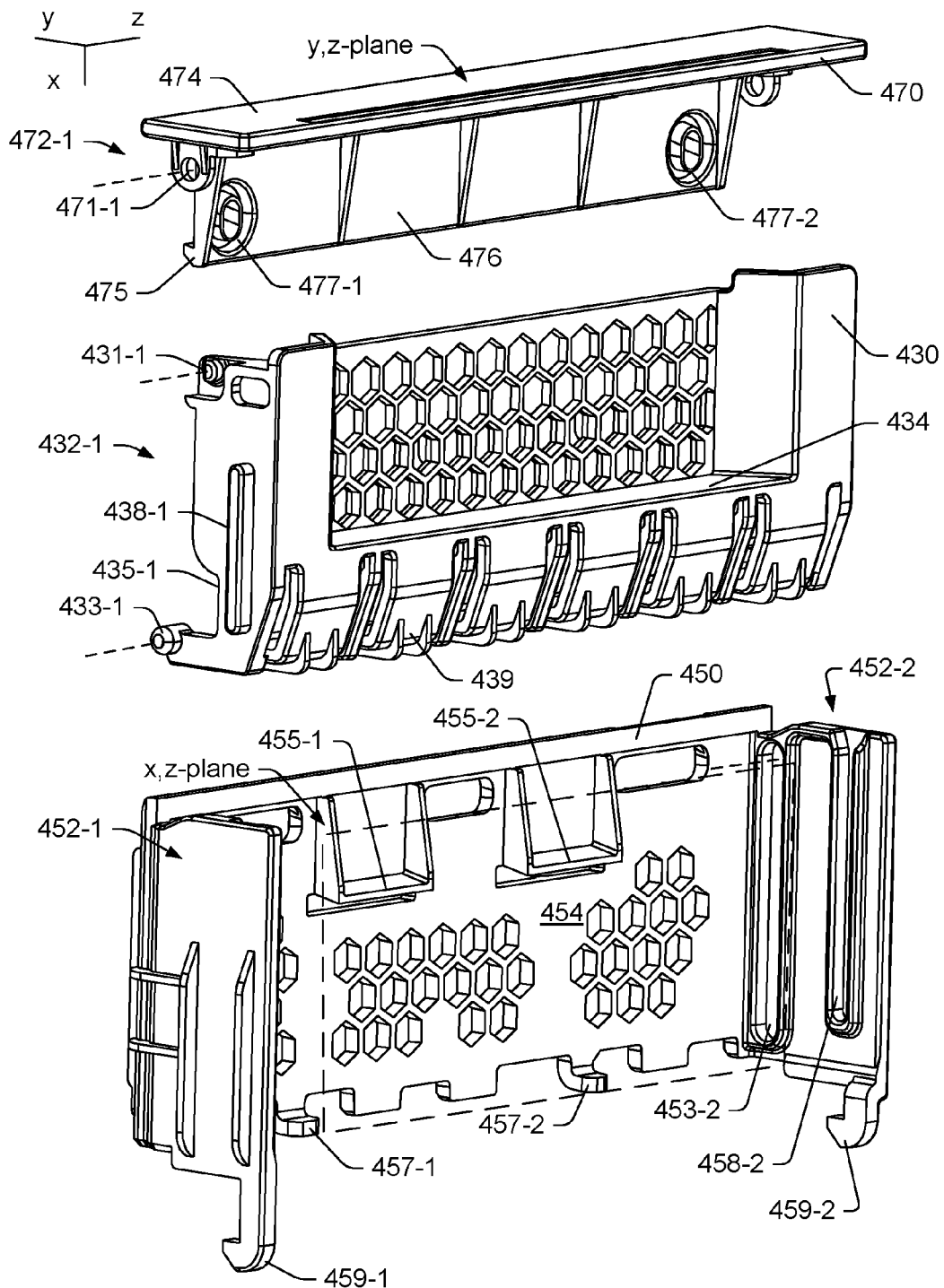
FIG. 5 and FIG. 6 are a series of diagrams of views of various components of the card retention assembly of FIG. 4.
Figure 6:
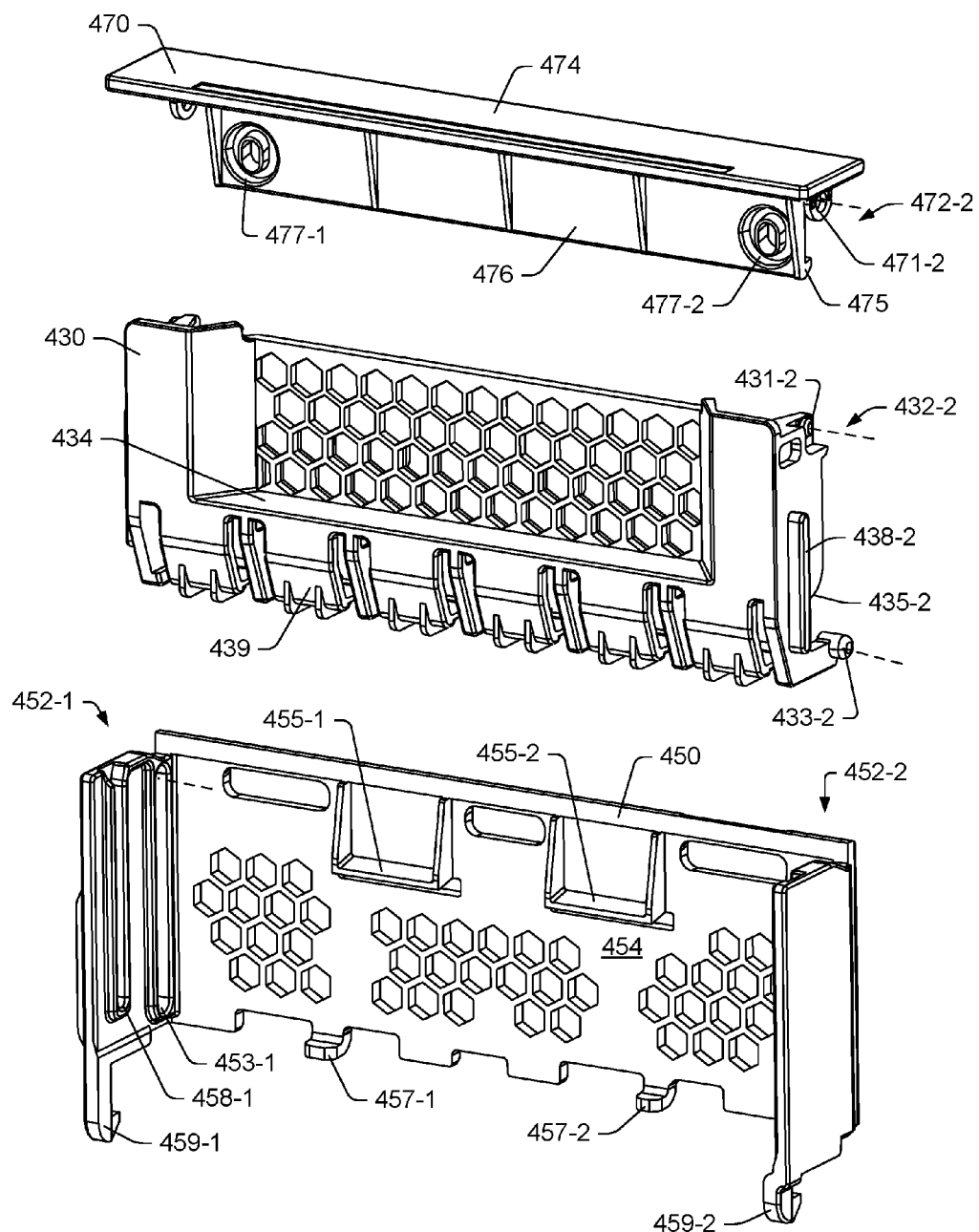

FIG. 4 shows two perspective views of the card retention assembly 410 and FIG. 5 and FIG. 6 show perspective views of the handle 470, the retainer 430 and the bracket 450 of the card retention assembly 410.

In the example of FIG. 5 and FIG. 6, the retainer 430 can include one or more handle axles 431-1 and 431-2, a first side wall 432-1 with a feature 435-1, a second side wall 432-2 with a feature 435-2, one or more retainer axles 433-1 and 433-2, and a cross-member 434 disposed between the first and second side walls 432-1 and 432-2. As an example, the first and second side walls 432-1 and 432-2 can include ridges 438-1 and 438-2, respectively, and the cross-member 434 can include one or more tongues 439; noting that the example of FIG. 5 shows the cross-member 434 as including six tongues (e.g., one tongue for each card slot, etc.). As shown in FIG. 3, the feature 435-1 of the first side wall 432-1 and the feature 435-2 of the second side wall 432-2 receive the back portion 202 of the chassis 200 when the retainer 430 is rotated to the open orientation.

In the example of FIG. 5 and FIG. 6, the bracket 450 can include a first side wall 452-1, a second side wall 452-2 and a cross-member 454. As an example, the first and second side walls 452-1 and 452-2 can include respective guides 453-1, 458-1 and 453-2, 458-2 and, for example, respective prongs 459-1 and 459-2. As shown, the cross-member 454 can include one or more keepers 455-1 and 455-2 and one or more prongs 457-1 and 457-2.

In the example of FIG. 5 and FIG. 6, the handle 470 can include journals 471-1 and 471-2, a first side 472-1, a second side 472-2, a handle portion 474 and a latch 475 that extends from a latch portion 476. As shown, the handle 470 can include seats 477-1 and 477-2 that can seat, for example, respective springs. In such an example, the springs may be at least a portion of a biasing mechanism that can bias the handle 470 with respect to the retainer 430, for example, to apply force to the latch 475 such that it engages the one or more keepers 455-1 and 455-2 of the bracket 450.

As an example, the journals 471-1 and 471-2 may receive the handle axles 431-1 and 431-2 of the retainer 430 such that the handle 430 may rotate with respect to the retainer 430. For example, the handle 430 may rotate in a counter-clockwise direction in the perspective view of FIG. 5 such that the latch 475 disengages the one or more keepers 455-1 and 455-2 of the bracket 450. As an example, consider a user gripping the handle 470 and applying a force sufficient to overcome a force exerted by a biasing mechanism such that the handle 470 pivots with respect to the retainer 430 and such that the latch 475 disengages the one or more keepers 455-1 and 455-2 of the bracket 450. In such an example, the user may translate the retainer 430 with respect to the bracket 450 in a manner where the ridges 438-1 and 438-2 guide the retainer 430 via the guides 458-1 and 458-2 of the bracket 450 and where the retainer axles 433-1 and 433-2 guide the retainer 430 via the guides 453-1 and 453-2 of the bracket 450. As indicated in FIG. 5 and FIG. 6, the retainer axles 433-1 and 433-2 may be disposed at a position or positions that are lower than a lowermost end or ends of the ridges 438-1 and 438-2. In such an example, upon translation of the retainer 430 a particular distance with respect to the bracket 450, the retainer 430 may rotate (e.g., pivot), for example, in a counter-clockwise direction (e.g., per the perspective of FIG. 5).

As an example, at least one of the guides 453-1 and 453-2 may include an upper surface that acts as a stop that stops translation of the retainer 430 with respect to the bracket 450. Such a stop or stops may demarcate a pivot point where the ridges 438-1 and 438-2 clear their respective guides 458-1 and 458-2; thereby allowing rotation of the retainer 430 with respect to the bracket 450.

Figure 7:
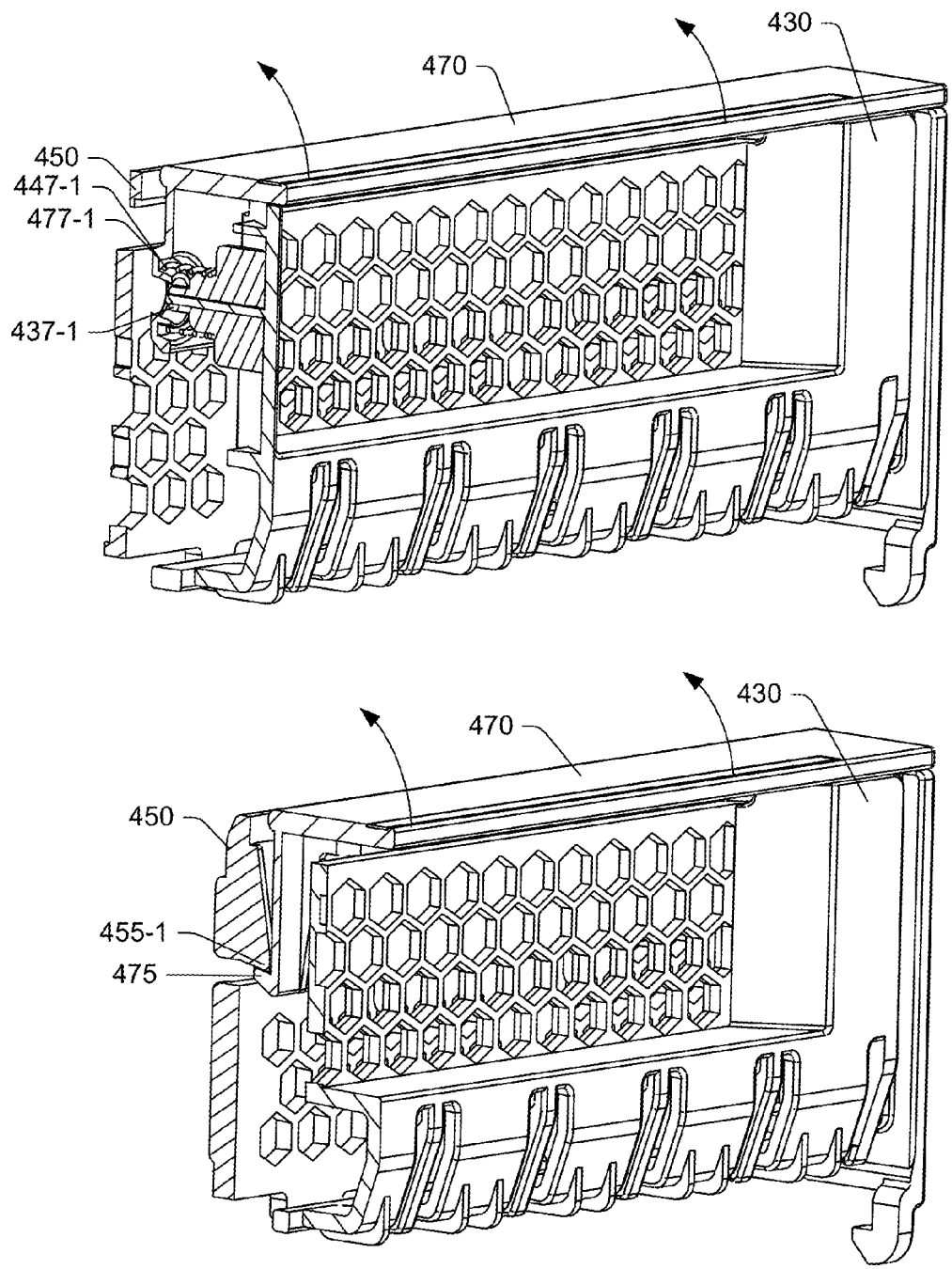
FIG. 7 is a series of diagram of cutaway views of an example of the card retention assembly of FIG. 4.

FIG. 7 shows two cutaway views of the card retention assembly 410. In an upper cutaway view, a biasing mechanism may be seen. In the example of FIG. 7, the biasing mechanism includes the seat 477-1 of the handle and a post 437-1 of the retainer 430 and a spring 477-1 disposed therebetween that can apply a biasing force that biases the handle 470 in a latched orientation with respect to the latch 475 and the one or more keepers 455-1 and 455-2 of the bracket 450.

In a lower cutaway view, a latching mechanism may be seen. In the example of FIG. 7, the latching mechanism includes the latch 475 of the handle 470 and the keeper 455-1 of the bracket 450. In a latched orientation, the retainer 430 may be secured in the bracket 450 in a manner whereby the tongues 439 of the retainer 430 may apply force to one or more backplates, which may be coupled to one or more cards. In such a manner, the tongues 439 may act to retain the one or more backplates and one or more cards coupled thereto in one or more slots (e.g., consider PCI cards in PCI slots, etc.).

As an example, a card retention assembly may include one or more components that include airflow openings. For example, the retainer 430 and the bracket 450 as shown in FIG. 7 include airflow openings (e.g., in respective panels that extend between sides walls, etc.). As shown, in the retention orientation, a gap exists between a panel of the retainer 430 and a panel of the bracket 450. In such an example, air may flow via airflow openings in the retainer 430 to the gap and via the airflow openings in the bracket 450.

As an example, a card retention assembly may be a card retention mechanism. As an example, a card retention assembly may be operatively coupled to a portion of a chassis of a computing system, optionally in a tool-less manner. For example, the various prongs of the bracket 450 may snap-fit or otherwise couple to a portion of a chassis. As an example, a card retention assembly may allow for tool-less insertion and tool-less removal of one or more cards from one or more slots of a computing system. In such an example, the card retention assembly may be manipulated by hand (e.g., via a handle, etc.) to a retention orientation that retains one or more cards in one or more slots of a computing system. As an example, a card retention assembly may include a movable retainer that can be positioned with respect to one or more backplates of one or more cards to retain the one or more cards, for example, in one or more slots.

As an example, a card retention mechanism can provide for removing and installing an adapter card such as, for example, an adapter card that includes an edge connector. For example, consider an edge that can be received by a slot. As an example, a card retention mechanism may retain one or more cards without use of one or more screws that are screwed into openings where the screws act to clamp a backplate to another component where the backplate is attached to a card.

As an example, a card retention mechanism may include a retainer that may be maneuvered to a position that does not interfere with lifting one or more cards out of one or more card slots and/or that does not interfere with inserting one or more cards into one or more card slots.

As an example, a card retention mechanism may include a retainer that may be latchable and unlatchable (e.g., via a latch mechanism). As an example, such a retainer may be unlatched via the latch mechanism and moved (e.g., translated and/or rotated). As an example, the retainer may be translated and then rotated to move the retainer away from a path or paths for card insertion and/or card removal from respective card slots (e.g., optionally card slots of a motherboard of a computing system). As an example, a retainer may be configured to rotate by approximately 90 degrees. For example, the retainer may rotate from a first plane to a second plane where the second plane is approximately orthogonal to the first plane. In such an example, the first plane and the second plane may be approximately orthogonal to a plane defined by a card positioned in a slot. With respect to the Cartesian coordinate system shown in FIG. 1, a card may disposed in a x,y-plane and a retainer may be disposed in an x,z-plane. In such an example, the retainer may be rotatable to a y,z-plane.

As an example, a system can include a chassis; a board operatively coupled to the chassis where the board includes card slots aligned along respective parallel planes and circuitry operatively coupled to the slots; a processor operatively coupled to the circuitry of the board; memory accessible by the processor; a retainer; and a bracket operatively coupled to the chassis where the bracket includes a guide that guides rotation of the retainer to and translation of the retainer along a plane orthogonal to the parallel planes. In such an example, the retainer may include side members and a cross-member (e.g., side walls and a cross-member or cross wall).

As an example, a cross-member of a retainer may include a plurality of tongues. As an example, the tongues may be formed integral to a retainer and include clearances along sides of each tongue that permit movement of the tongue (e.g., flexing of the tongue). As an example, a tongue may be a spring tongue.

As an example, a retainer may be formed of a material using an injection molding technique. In such an example, the retainer may include one or more portions that are formed with dimensions and clearances that allow such portions to flex.

As an example, a retainer may include one or more tongues where such one or more tongues include cutouts configured to accommodate screws. For example, where a tongue is positioned proximate to a top side of a backplate of a card where the backplate includes an opening (e.g., or cutout) to receive a screw, a tongue may include a corresponding cutout that may be sized to clear a head of such a screw.

As an example, a card retention assembly may include a card retention orientation where a retainer of the assembly is disposed along a plane orthogonal to parallel planes that may be defined by card slots, cards, etc. In such an example, in a card positioning orientation, the retainer may be disposed in another plane, which may be, for example, a plane is orthogonal to the parallel planes.

As an example, a card retention assembly may include a handle operatively coupled to a retainer. In such an example, a biasing mechanism may be included that biases the handle with respect to the retainer.

As an example, a handle of a card retention assembly may include a latch and a keeper. For example, a handle may include a latch and a bracket may include a keeper. In such an example, where the handle is operatively coupled to a retainer, the handle may releasably latch the retainer with respect to the bracket. As an example, a card retention assembly may include a biasing mechanism that biases a latch in a latched orientation with respect to a keeper. As an example, such a latch may include a beveled surface that extends to an edge. In such an example, a keeper may include a beveled surface that can be a contact surface for the beveled surface of the latch.

As an example, a handle of a card retention assembly may be pivotably coupled to a retainer where, for example, pivoting of the handle releases a latch of the handle from a keeper of a bracket.

As an example, a card retention assembly may include a retainer that includes an axle and a ridge where guides of a bracket include an axle guide and a ridge guide. In such an assembly, in an orientation where the ridge is disposed in the ridge guide, the ridge and the ridge guide may limit pivoting of the retainer with respect to the bracket.

As an example, a system can include a motherboard where a processor is mounted to the motherboard via a processor socket. As an example, a system may include a card disposed in one of a plurality of card slots. In such an example, the card slots may include one or more PCI card slots. In such an example, the system may include PCI cards disposed in PCI card slots.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 8:
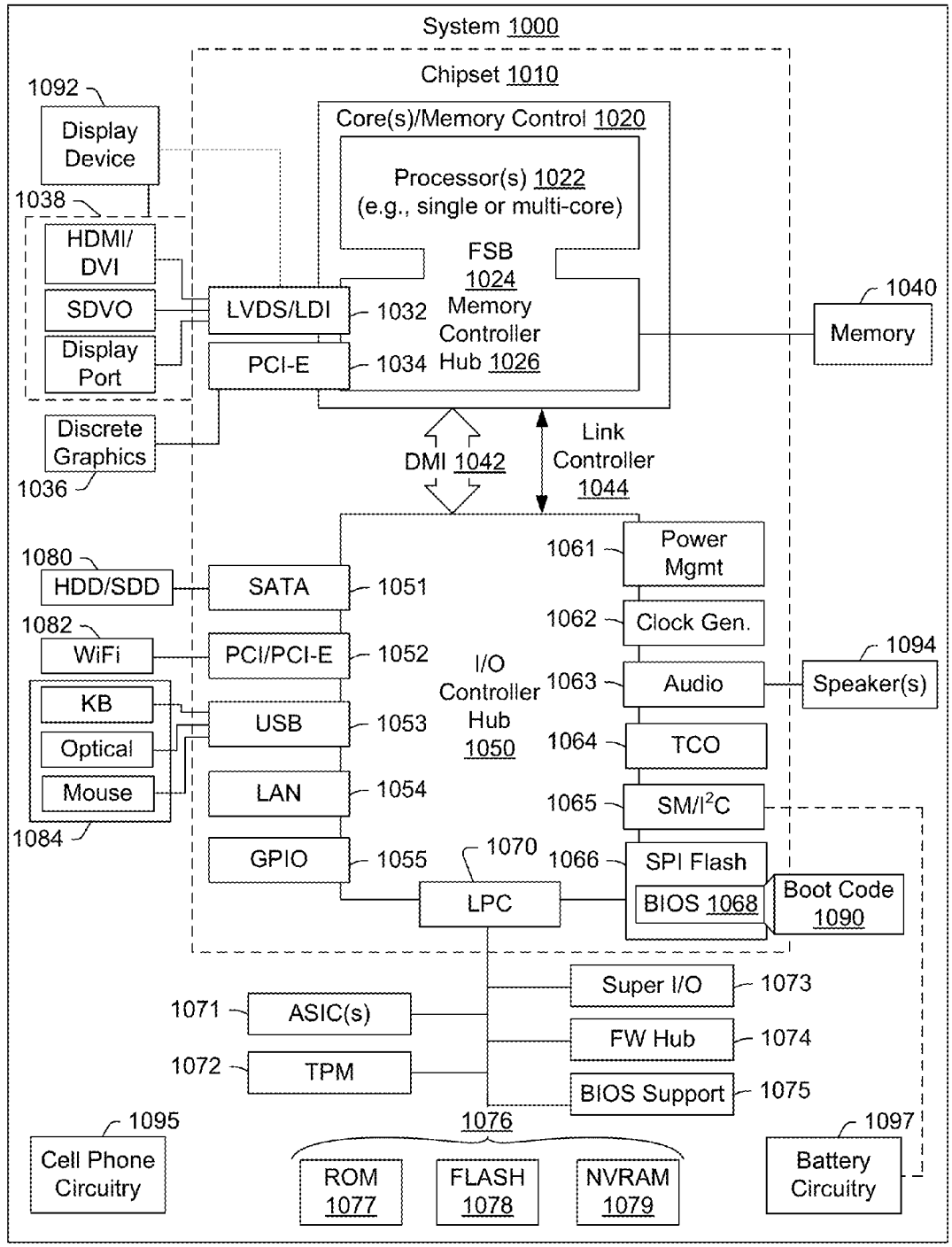
FIG. 8 is a diagram of an example of circuitry of a system, a device, etc.

While various examples of circuits or circuitry may be shown or discussed, FIG. 8 depicts a block diagram of an illustrative computer system 1000. The system 1000 may be a computer system, such as one of the ThinkCentre® or ThinkPad® series of computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 1000 (e.g., consider the ThinkServer® server sold by Lenovo (US) Inc. of Morrisville, N.C.).

As shown in FIG. 8, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 8, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 8 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 8, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.).

In the example of FIG. 8, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 8. Further, the system 1000 of FIG. 8 is shown as optionally including cell phone circuitry 1095, which may include GSM, CDMA, etc., types of circuitry configured for coordinated operation with one or more of the other features of the system 1000.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a chassis that comprises front and back portions disposed in respective x,z-planes;
a board disposed in a y,z-plane operatively coupled to the chassis wherein the board comprises card slots aligned along respective parallel x,y-planes and circuitry operatively coupled to the slots;
a processor operatively coupled to the circuitry of the board;
memory accessible by the processor;
a retainer that comprises a side member and a cross-member;
a handle operatively coupled to the retainer;
a biasing mechanism that biases the handle with respect to the retainer; and
a bracket operatively coupled to the back portion of the chassis and disposed between the back and front portions of the chassis wherein the retainer is operatively coupled to the bracket and wherein the bracket comprises a side wall disposed in an x,y-plane that comprises a guide that guides rotation of the retainer from an open orientation to an x,z-plane orthogonal to the parallel x,y-planes and that guides the side member of the retainer for translation of the cross-member of the retainer along the x,z-plane toward the y,z-plane of the hoard to a card retention orientation.

2. The system of claim 1 wherein the retainer comprises side members.

3. The system of claim 1 wherein the cross-member comprises a plurality of tongues.

4. The system of claim 3 wherein the tongues comprise spring tongues.

5. The system of claim 3 wherein the tongues comprise cutouts configured to accommodate screws.

6. The system of claim 1 wherein, in the card retention orientation, the retainer is disposed along the plane orthogonal to the parallel planes.

7. The system of claim 1 wherein, in a card positioning orientation, the retainer is disposed along another plane.

8. The system of claim 7 wherein the other plane is orthogonal to the parallel planes.

9. The system of claim 1 wherein the handle comprises a latch and wherein the bracket comprises a keeper.

10. The system of claim 9 wherein the biasing mechanism biases the latch in a latched orientation with respect to the keeper.

11. The system of claim 9 wherein the latch comprises a beveled surface that extends to an edge.

12. The system of claim 1 wherein the handle is pivotally coupled to the retainer and wherein pivoting of the handle releases a latch of the handle from a keeper of the bracket.

13. The system of claim 1 wherein the retainer comprises an axle and a ridge, wherein the bracket comprises an axle guide and a ridge guide and wherein the axle guide guides translation of the axle.

14. The system of claim 13 wherein, in an orientation where the ridge is disposed in the ridge guide, the ridge and the ridge guide limit pivoting of the retainer with respect to the bracket.

15. The system of claim 1 wherein the board comprises a motherboard wherein the processor is mounted to the board via a processor socket.

16. The system of claim 1 comprising a card disposed in one of the card slots.

17. The system of claim 1 wherein the card slots comprise PCI card slots.

18. The system of claim 17 comprising PCI cards disposed in the PCI card slots.

* * * * *